US011346517B2

(12) United States Patent
Kurosu et al.

(10) Patent No.: US 11,346,517 B2
(45) Date of Patent: May 31, 2022

(54) LENS HOLDING STRUCTURE AND VEHICULAR LAMP FITTING

(71) Applicant: STANLEY ELECTRIC CO., LTD., Tokyo (JP)

(72) Inventors: Hiroaki Kurosu, Tokyo (JP); Takumi Tanokura, Tokyo (JP); Hidetaka Okada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 252 days.

(21) Appl. No.: 16/473,991

(22) PCT Filed: Dec. 22, 2017

(86) PCT No.: PCT/JP2017/046085
§ 371 (c)(1),
(2) Date: Jun. 26, 2019

(87) PCT Pub. No.: WO2018/123851
PCT Pub. Date: Jul. 5, 2018

(65) Prior Publication Data

US 2021/0131633 A1 May 6, 2021

(30) Foreign Application Priority Data

Dec. 26, 2016 (JP) ............................. JP2016-251374

(51) Int. Cl.
*B60Q 1/00* (2006.01)
*F21S 41/29* (2018.01)
(Continued)

(52) U.S. Cl.
CPC ........... *F21S 41/295* (2018.01); *F21S 41/275* (2018.01); *F21S 45/47* (2018.01); *F21S 45/49* (2018.01)

(58) Field of Classification Search
CPC ........ F21S 41/25; F21S 41/255; F21S 41/295; F21S 41/27; F21S 41/37; F21S 41/24;
(Continued)

(56) References Cited

U.S. PATENT DOCUMENTS 9,007,683 B2 * 4/2015 Kubala .................. G02B 7/003 359/356
9,285,092 B2 * 3/2016 Anzai ................... F21S 41/143
(Continued)

FOREIGN PATENT DOCUMENTS

CN 103672635 A 3/2014
CN 205244904 U 5/2016
(Continued)

OTHER PUBLICATIONS

Extended European Search Report for the related European Patent Application No. 17889509.0 dated Nov. 10, 2020.
(Continued)

*Primary Examiner* — Omar Rojas Cadima
(74) *Attorney, Agent, or Firm* — Kenealy Vaidya LLP

(57) ABSTRACT

A lens holding structure, comprising a first holding member, a first lens disposed ahead of the first holding member, a second lens disposed ahead of the first lens, a second holding member disposed ahead of the second lens, and a fixing unit that fixes the first holding member and the second holding member in a state of holding the first lens and the second lens between the first holding member and the second holding member, wherein the first lens and the second lens are held between the first holding member and the second holding member in a state of the optical surface of the second lens being surface-contacted with the optical surface of the first lens.

13 Claims, 11 Drawing Sheets

(51) Int. Cl.

| | |
|---|---|
| ***F21S 41/275*** | (2018.01) |
| ***F21S 45/49*** | (2018.01) |
| ***F21S 45/47*** | (2018.01) |

(58) Field of Classification Search

CPC ...... F21S 41/265; F21S 41/285; F21S 41/275; F21S 41/26; F21S 41/60; F21S 41/683; F21S 41/686; F21S 41/29; F21S 41/19; F21S 41/55; F21S 41/47; F21V 5/04; F21V 13/12; F21V 5/008

See application file for complete search history.

(56) References Cited

U.S. PATENT DOCUMENTS

| | | | | |
|---|---|---|---|---|
| 10,309,636 | B2 * | 6/2019 | Sommerschuh | F21S 41/176 |
| 2005/0128762 | A1 * | 6/2005 | Goraguer | F21S 41/295 362/509 |
| 2018/0187866 | A1 | 7/2018 | Huang | |

FOREIGN PATENT DOCUMENTS

| | | | |
|---|---|---|---|
| EP | 2 690 348 | A2 | 1/2014 |
| JP | H02-119001 | A | 5/1990 |
| JP | 2014-067529 | A | 4/2014 |
| JP | 2014-127298 | A | 7/2014 |
| JP | 2015-079660 | A | 4/2015 |
| KR | 10-2012-0126422 | A | 11/2012 |
| WO | 2018/123851 | A1 | 7/2018 |

OTHER PUBLICATIONS

Chinese Office Action for the related Chinese Patent Application No. 201780080738.5 dated Mar. 25, 2020.

Written Opinion of the International Search Report for PCT/JP2017/046085 dated Mar. 27, 2018.

International Search Report and Written Opinion of the International Search Report for PCT/JP2017/046085 dated Mar. 27, 2018.

* cited by examiner

LENS HOLDING STRUCTURE AND VEHICULAR LAMP FITTING

CROSS-REFERENCE TO RELATED APPLICATIONS

This application is a U.S. National Stage Application under 35 U.S.C § 371 of International Patent Application No. PCT/JP2017/046085 filed 22 Dec. 2017, which claims the benefit of priority to Japanese Patent Application No. 2016-251374 filed 26 Dec. 2016, the disclosures of all of which are hereby incorporated by reference in their entireties.

TECHNICAL FIELD

The present invention relates to a lens holding structure and a vehicular lamp fitting, and more particularly to a lens holding structure which firmly surface-contacts a plurality of lenses for a long period of time, and a vehicular lamp fitting including this lens holding structure.

BACKGROUND ART

Conventionally, a vehicular lamp fitting including: a first lens (light guiding lens) constituted of an entry surface and an exit surface; a light source, such as LED, which emits light to form a luminous intensity distribution on an exit surface when light enters the first lens through the entry surface and exits the first lens through the exit surface; and a second lens (projection lens) which forms a low beam light distribution pattern by inversely projecting the luminous intensity distribution formed on the exit surface, wherein the optical surface of the first lens and the optical surface of the second lens are surface-contacted, has been proposed (e.g. Patent Literature 1 (FIG. 1)).

CITATION LIST

Patent Literature

Patent Literature 1: Japanese Laid-open Patent Publication No. 2015-79660

SUMMARY OF INVENTION

Problems to be Solved by the Invention

However, the vehicular lamp fitting according to Patent Literature 1 is configured such that the optical surface of the first lens and the optical surface of the second lens are surface-contacted using a transparent adhesive (e.g. silicon resin), in other words, the optical surface of the first lens and the optical surface of the second lens are surface-contacted by attractive force, hence the surface-contacting force thereof is weak, and becomes even weaker as the transparent adhesive (e.g. silicon resin) deteriorates over the years. As a result, it is difficult to firmly surface-contact the optical surface of the first lens and the optical surface of the second lens for a long period of time, which causes the problem.

With the foregoing in view, it is an object of the present invention to provide a lens holding structure which firmly surface-contacts a plurality of lenses for a long period of time, and a vehicular lamp fitting including this lens holding structure.

MEANS FOR SOLVING THE PROBLEMS

In order to achieve the object described above, an aspect of the present invention provides a lens holding structure, comprising a first holding member, a first lens disposed ahead of the first holding member, a second lens disposed ahead of the first lens, a second holding member disposed ahead of the second lens, and a fixing unit that fixes the first holding member and the second holding member in a state of holding the first lens and the second lens between the first holding member and the second holding member, wherein the first lens and the second lens are held between the first holding member and the second holding member in a state of the optical surface of the second lens being surface-contacted with the optical surface of the first lens.

According to this aspect, a lens holding structure which firmly surface-contacts a plurality of lenses for a long period of time is provided.

This is because the first lens and the second lens are held between the first holding member and the second holding member in a state where the optical surface of the first lens and the optical surface of the second lens are surface-contacted.

In addition, in a preferred aspect of the invention described above, a lens holding structure, comprising a first holding member in which a first lens is integrally molded, a second lens disposed ahead of the first lens, a second holding member disposed ahead of the second lens, and a fixing unit that fixes the first holding member and the second holding member in a state of holding the second lens between the first lens and the second holding member, wherein the second lens is held between the first holding member and the second holding member in a state of the optical surface of the second lens being surface-contacted with the optical surface of the first lens.

In addition, in a preferred aspect of the invention described above, the first lens and the second lens are held between the first holding member and the second holding member in a state of the surface, other than the optical surface of the first lens, not contacting the second lens.

In addition, in a preferred aspect of the invention described above, further comprising a heat sink disposed behind the first holding member, a light source module fixed on the front surface of the heat sink, and a third lens disposed ahead of the second lens, wherein the first holding member includes a first portion which comes into contact with the front surface of the heat sink, the second lens includes a flange unit, the second holding member includes a second portion which comes into contact with the front surface of the heat sink, and a presser unit which presses down on the flange unit of the second lens, the third lens includes a third portion which comes into contact with the second portion of the second holding member, and the fixing unit fixes the first holding member and the second holding member in a state of the first portion of the first holing member abutting the front surface of the heat sink, the second portion of the second holding member abutting the front surface of the heat sink, the third portion of the third lens abutting the second portion of the second holding member, and the pressor unit of the second holding member abutting the flange unit of the second lens.

In addition, in a preferred aspect of the invention described above, the fixing unit jointly fastens the heat sink, the second portion of the second holding member which comes into contact with the front surface of the heat sink, and the third portion of the third lens which comes into contact with the second portion of the second holding member.

In addition, in a preferred aspect of the invention described above, a space is formed between the first lens and the flange unit of the second lens.

In addition, in a preferred aspect of the invention described above, at least one convex portion, which comes into contact with the flange unit of the second lens, is disposed in the first holding member.

In addition, in a preferred aspect of the invention described above, the convex portion includes a first convex portion which protrudes forward, and a second convex portion which is narrower than the first convex portion and protrudes more forward than the first convex portion.

In addition, in a preferred aspect of the invention described above, a space is formed between an area around the first portion of the first holding member and an area around the second portion of the second holding member.

In addition, in a preferred aspect of the invention described above, the first lens includes a first light guiding lens and a second light guiding lens which is disposed below the first light guiding lens.

another aspect of the present invention provides a vehicular lamp fitting, comprising the lens holding structure according to claim 1.

DESCRIPTION OF EMBODIMENTS

A vehicular lamp 10 (corresponding to a vehicular headlamp according to the present invention) according to an embodiment of the present invention is described below with reference to the attached drawings. Corresponding components in each drawing are denoted by the same reference symbols and overlapping descriptions are omitted.

Figure 1:
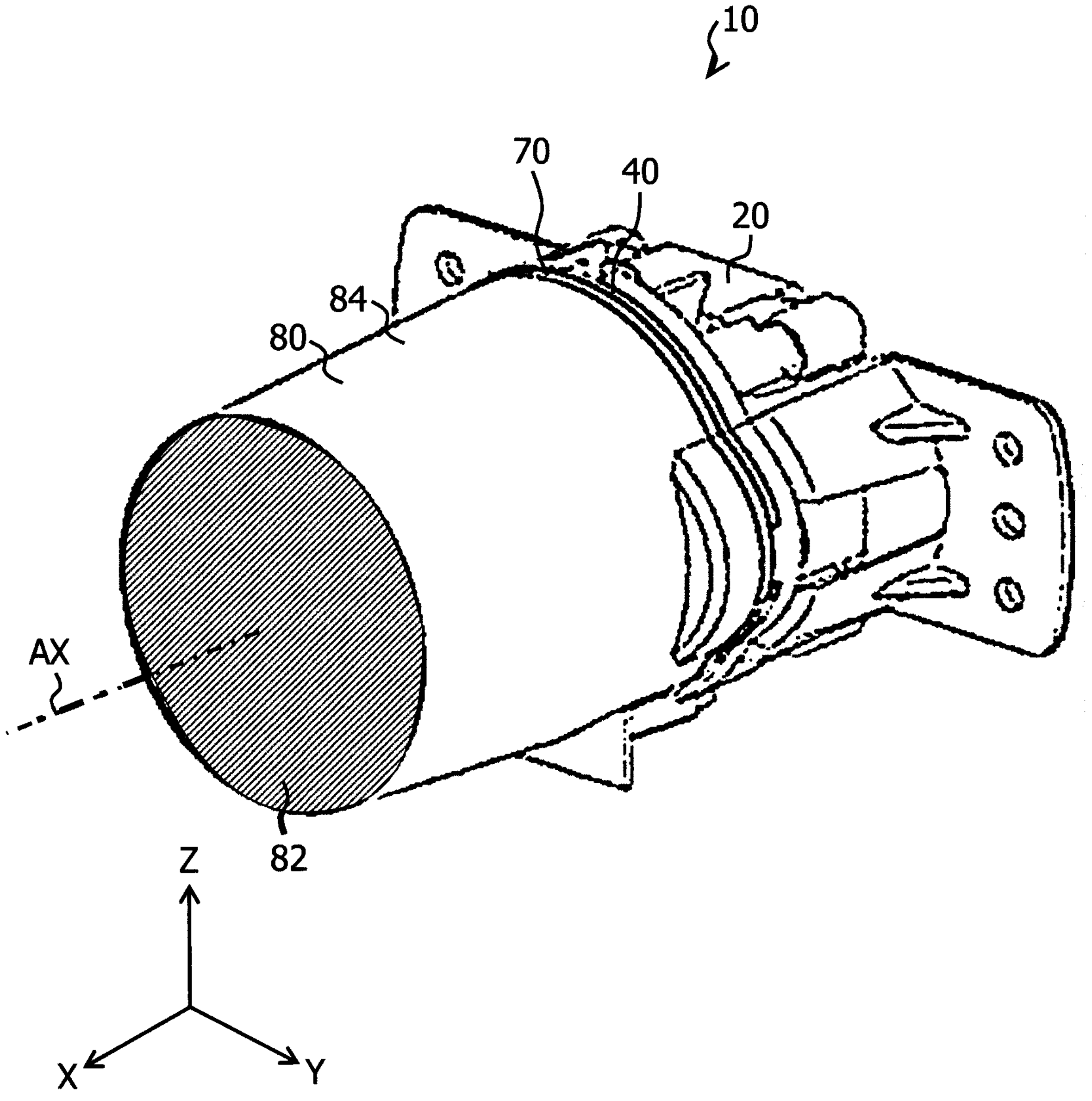
FIG. 1 is a perspective view depicting a vehicular lamp fitting 10.
Figure 2A:
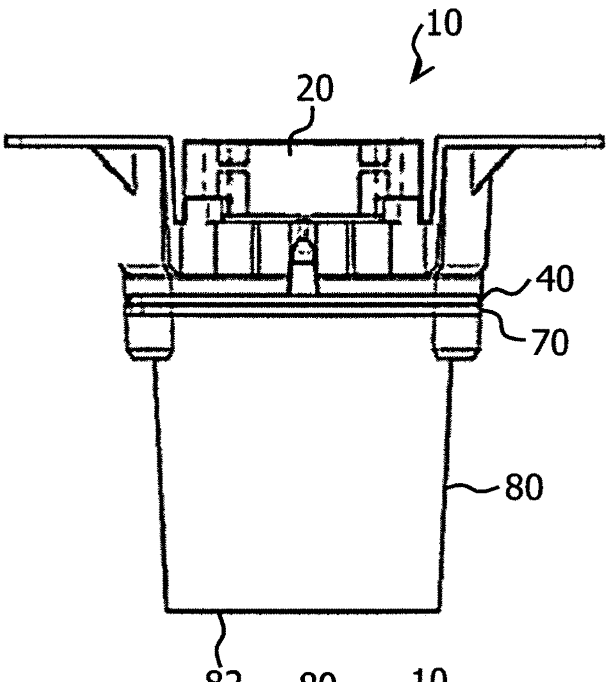
FIG. 2A is a top view.
Figure 2B:
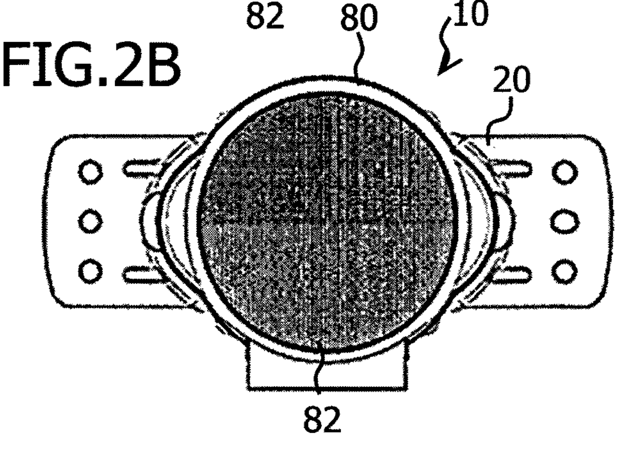
FIG. 2B is a front view.
Figure 2C:
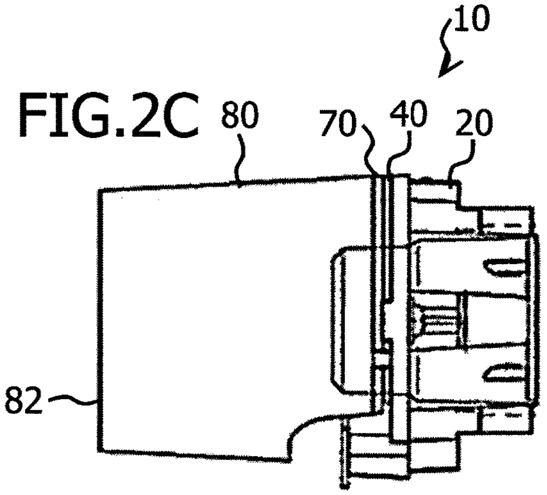
FIG. 2C is a side view of the vehicular lamp fitting 10.

FIG. 1 is a perspective view depicting a vehicular lamp fitting 10. FIG. 2A is a top view, FIG. 2B is a front view, and FIG. 2C is a side view of the vehicular lamp fitting 10.

The vehicular lamp fitting 10 illustrated in FIG. 1 and FIG. 2 is a vehicular head light that can form a low beam light distribution pattern $P_{Lo}$ (see FIG. 11A) or a composite light distribution pattern (see FIG. 11C) which includes a low beam light distribution pattern $P_{Lo}$ and an ADB light distribution pattern $P_{ADB}$, and is mounted on the left and right of the front end of a vehicle (not illustrated). The low beam light distribution pattern $P_{Lo}$ and the ADB light distribution pattern $P_{ADB}$ are formed on a virtual vertical screen (formed at about 25 m ahead of the front surface of the vehicle) which faces the front surface of the vehicle. To make explanation easier, the X, Y and Z axes are defined. The X axis extends in the vehicle length direction, the Y axis extends in the vehicle width direction, and the Z axis extends in the vertical direction.

Figure 3:
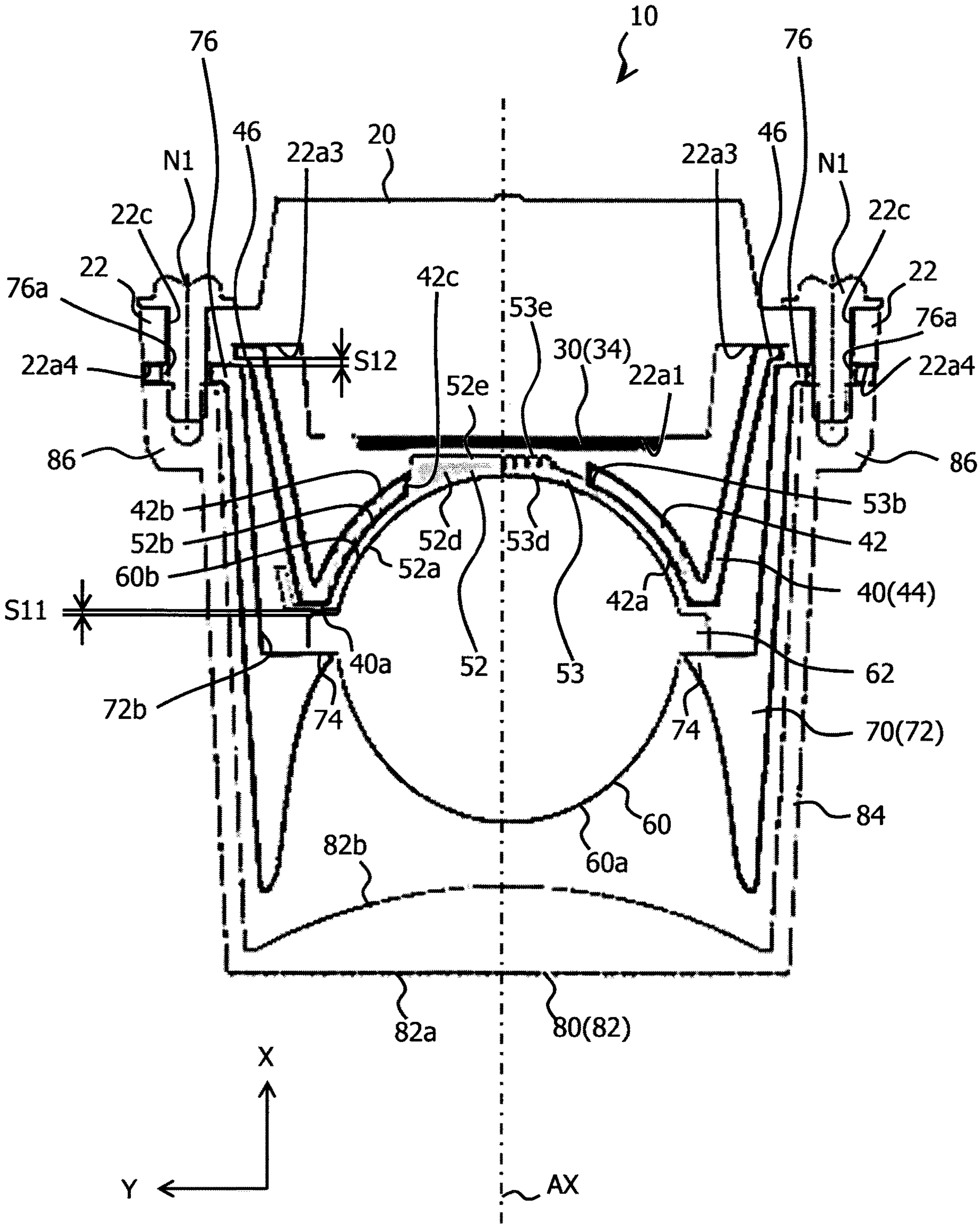
FIG. 3 is a cross-sectional view of the vehicular lamp fitting 10 illustrated in FIG. 1 sectioned at a horizontal plane which includes the reference axis AX (plane which includes the X axis and the Y axis).
Figure 4:
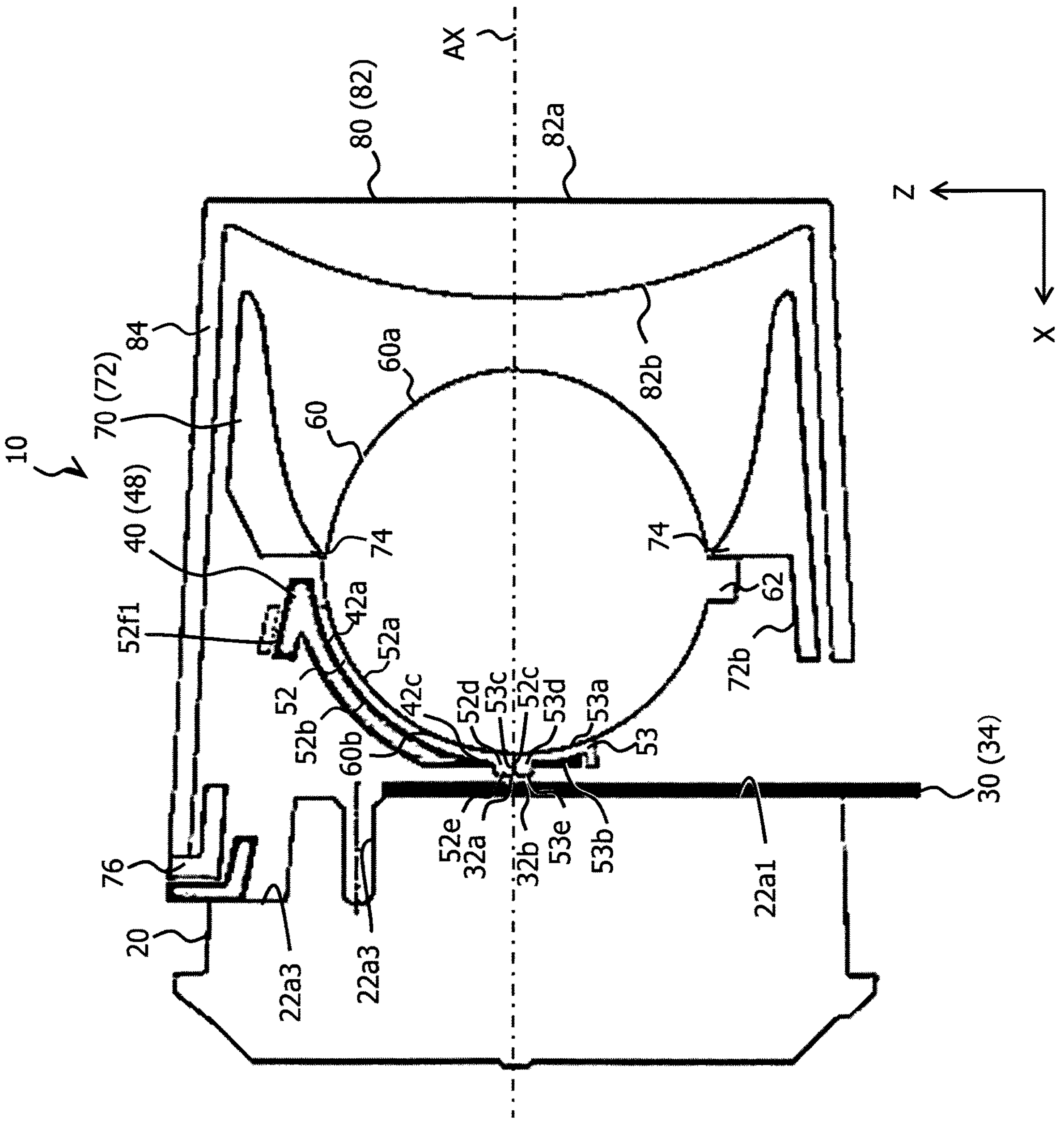
FIG. 4 is a cross-sectional view of the vehicular lamp fitting 10 illustrated in FIG. 1 sectioned at a vertical plane which includes the reference axis AX (plane which includes the X axis and the Z axis).
Figure 5:
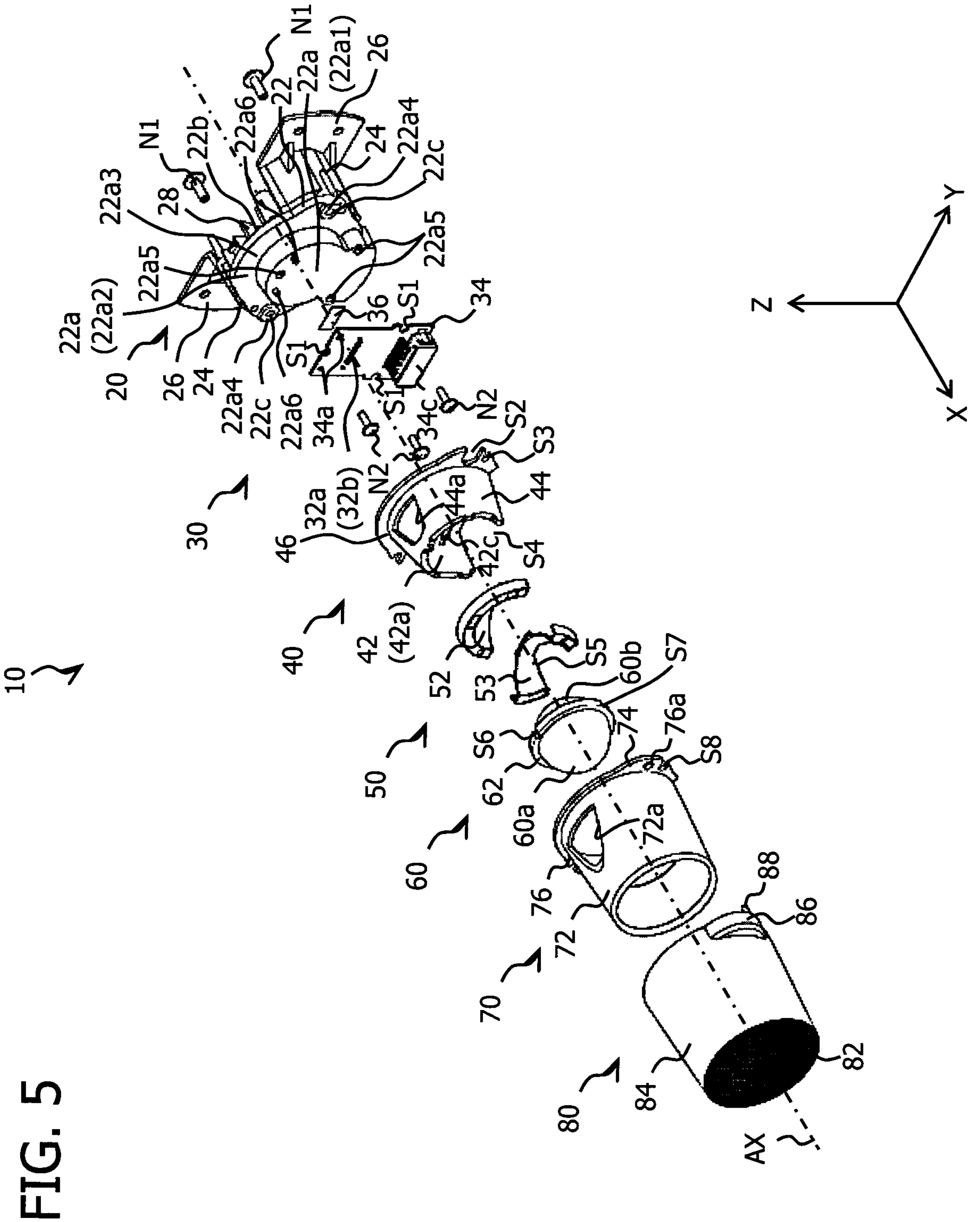
FIG. 5 is an exploded perspective view of the vehicular lamp fitting 10.

FIG. 3 is a cross-sectional view of the vehicular lamp fitting 10 illustrated in FIG. 1 sectioned at a horizontal plane which includes the reference axis AX (plane which includes the X axis and the Y axis). FIG. 4 is a cross-sectional view of the vehicular lamp fitting 10 illustrated in FIG. 1 sectioned at a vertical plane which includes the reference axis AX (plane which includes the X axis and the Z axis). FIG. 5 is an exploded perspective view of the vehicular lamp fitting 10.

As illustrated in FIG. 3 to FIG. 5, the vehicular lamp fitting 10 of this embodiment includes a heat sink 20, a light source module 30, a holder 40, a separator 50, a primary lens 60, a retainer 70, a secondary lens 80 and the like. The vehicular lamp fitting 10 is disposed in a lamp chamber (not illustrated) constituted by an outer lens and a housing, and is installed in the housing.

As illustrated in FIG. 5, the heat sink 20, which is made of die cast aluminum, includes a base 22 having a front surface 22*a*, and a back surface 22*b* on the opposite side of the front surface 22*a*.

The front surface 22*a* includes a light source module mounting surface 22*a*1, and a peripheral surface 22*a*2 surrounding the light source module mounting surface 22*a*1.

The light source module mounting surface 22*a*1 and the peripheral surface 22*a*2 are planes that are parallel with a plane which includes the Y axis and the Z axis, for example.

The thickness between the light source module mounting surface 22*a*1 and the back surface 22*b* (thickness in the X axis direction) is thicker than the thickness between the peripheral surface 22*a*2 and the back surface 22*b*(thickness in the X axis direction), whereby a step difference is formed.

In the light source module mounting surface 22*a*1, screw holes 22*a*5 (three locations in FIG. 3) are disposed to fix the light source module 30 by screwing. In the light source module mounting surface 22*a*1, positioning pins 22*a*6 (two locations in FIG. 3) are disposed to position the light source module 30.

The peripheral surface 22*a*2 includes a holder contact surface 22*a*3 with which the holder 40 contacts, and a retainer contact surface 22*a*4 with which the retainer 70 contacts.

The retainer contact surface 22*a*4 is disposed on the left and right side of the peripheral surface 22*a*2 respectively.

The thickness between the retainer contact surface 22*a*4 and the back surface 22*b* (thickness in the X axis direction) is thicker than the thickness between the holder contact surface 22*a*3 and the back surface 22*b* (thickness in the X axis direction), whereby a step difference is formed.

In the base 22, screw holes 22*c* (two locations in FIG. 3), where screws N1 are inserted, are disposed. The screw holes 22*c* penetrate the retainer contact surface 22*a*4 and the back surface 22*b*.

On the left and right sides of the base 22, the first extended edge 24 is formed, so as to extend backward (X axis direction) from the left and right sides of the base 22 respectively. On the front end of the first extended edge 24, a second extended edge portion 26 is formed so as to extend sideways (Y axis direction).

A radiation fin 28 is disposed on the back surface 22*b* of the base 22.

The light source module 30 includes: a plurality of low beam light sources 32*a*; a plurality of ADB light sources 32*b*; and a substrate 34 on which the plurality of low beam light sources 32*a*, the plurality of ADB alight sources 32*b* and a connector 34*c* are mounted. The plurality of light sources 32*a* correspond to the first light source of the present invention, and the plurality of light sources 32*b* correspond to the second light source of the present invention.

Figure 9A:
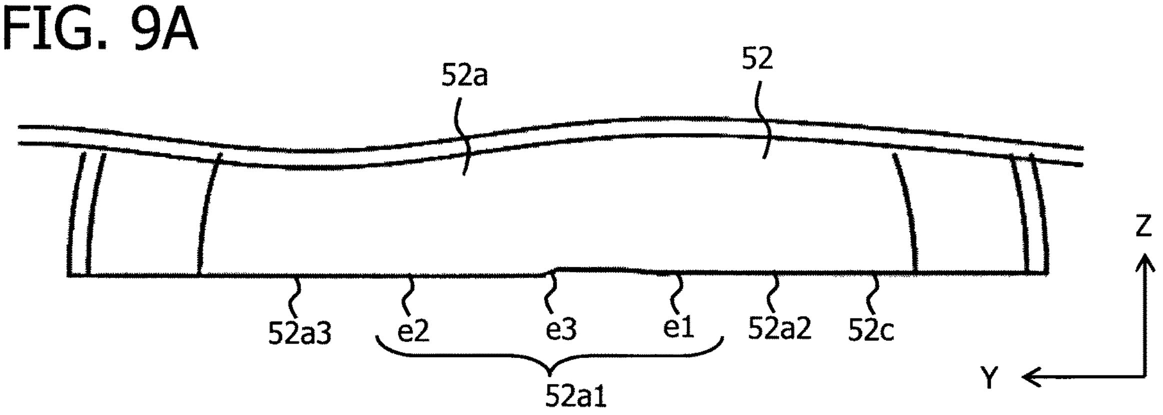
FIG. 9A is a front view of upper separator main body 52.
Figure 9B:
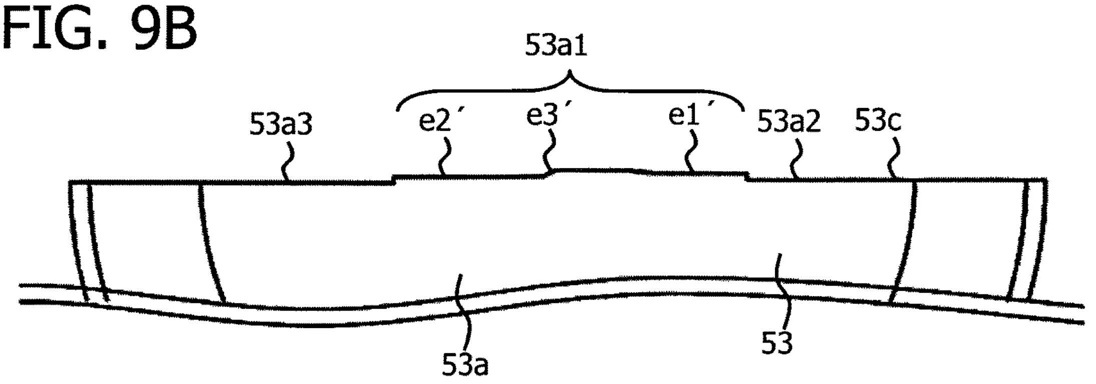
FIG. 9B is a front view of lower separator main body 53.
Figure 9C:
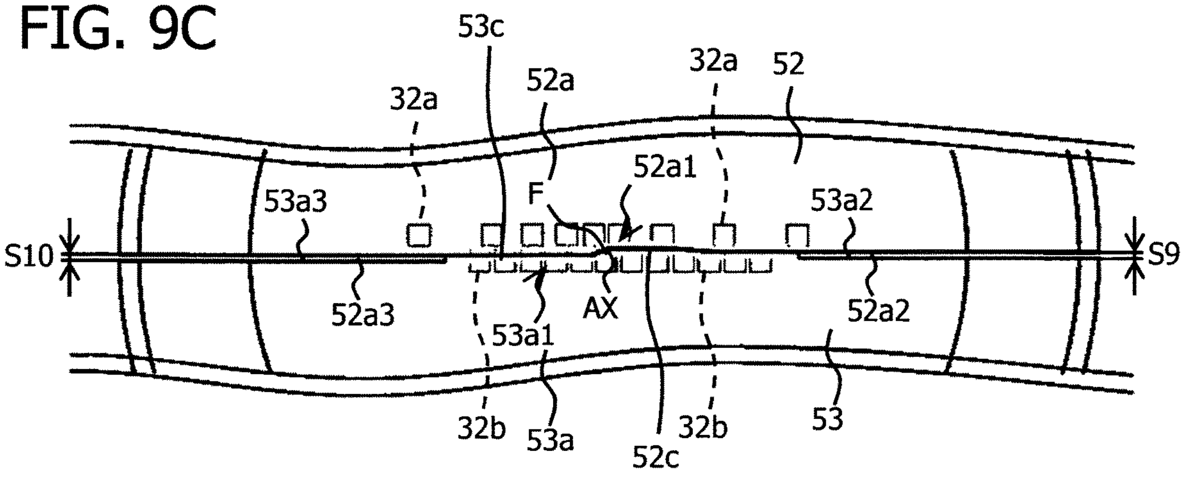
FIG. 9C is a front view (perspective view) of the plurality of low beam light sources 32*a* and the plurality of ADB light sources 32*b* when viewed through the separator 50.

FIG. 9C is a front view (perspective view) of the plurality of low beam light sources 32*a* and the plurality of ADB light sources 32*b* when viewed through the separator 50.

As illustrated in FIG. 9C, the plurality of low beam light sources 32*a* are mounted on the substrate 34 on the upper stage in the Y axis direction. The plurality of ADB light sources 32*b* are mounted on the substrate 34 on the lower stage in the Y axis direction.

Each of the light sources 32*a* and 32*b* is a semiconductor light-emitting element (e.g. LED) having a rectangular light-emitting surface (e.g. 1 millimeter square), and is mounted on the substrate 34 in a state of each light-emitting source facing forward (front surface). Each of a plurality of rectangles in FIG. 9C indicates the light-emitting surface of the light source 32*a* or 32*b* respectively.

In the substrate 34, through holes 34*a* (two locations in FIG. 5) to which the positioning pins 22*a*6 of the heat sink 20 are inserted, and notches S1 (three locations in FIG. 5) to which screws N2 are inserted, are formed.

The light source module 30 having the above configuration is fixed to the heat sink 20 (light source module mounting surface 22*a*1) by screwing the screws N2 inserted in the notches S1 into the screw holes 22*a*5 of the heat sink 20 in a state where the positioning pins 22*a*6 of the heat sink 20 are inserted into the through holes 34*a* of the substrate 34. For this, a thermal conduction sheet 36 (or thermal grease) is disposed between the light source module 30 (substrate 34) and the heat sink 20 (light source module mounting surface 22*a*1), in order to increase adhesion between the light source module 30 (substrate 34) and the heat sink 20 (light source module mounting surface 22*a*1), and decrease contact thermal resistance. The thermal conduction sheet 36 is held between the light source module 30 (substrate 34) and the heat sink 20 (light source module mounting surface 22*a*1).

Figure 6:
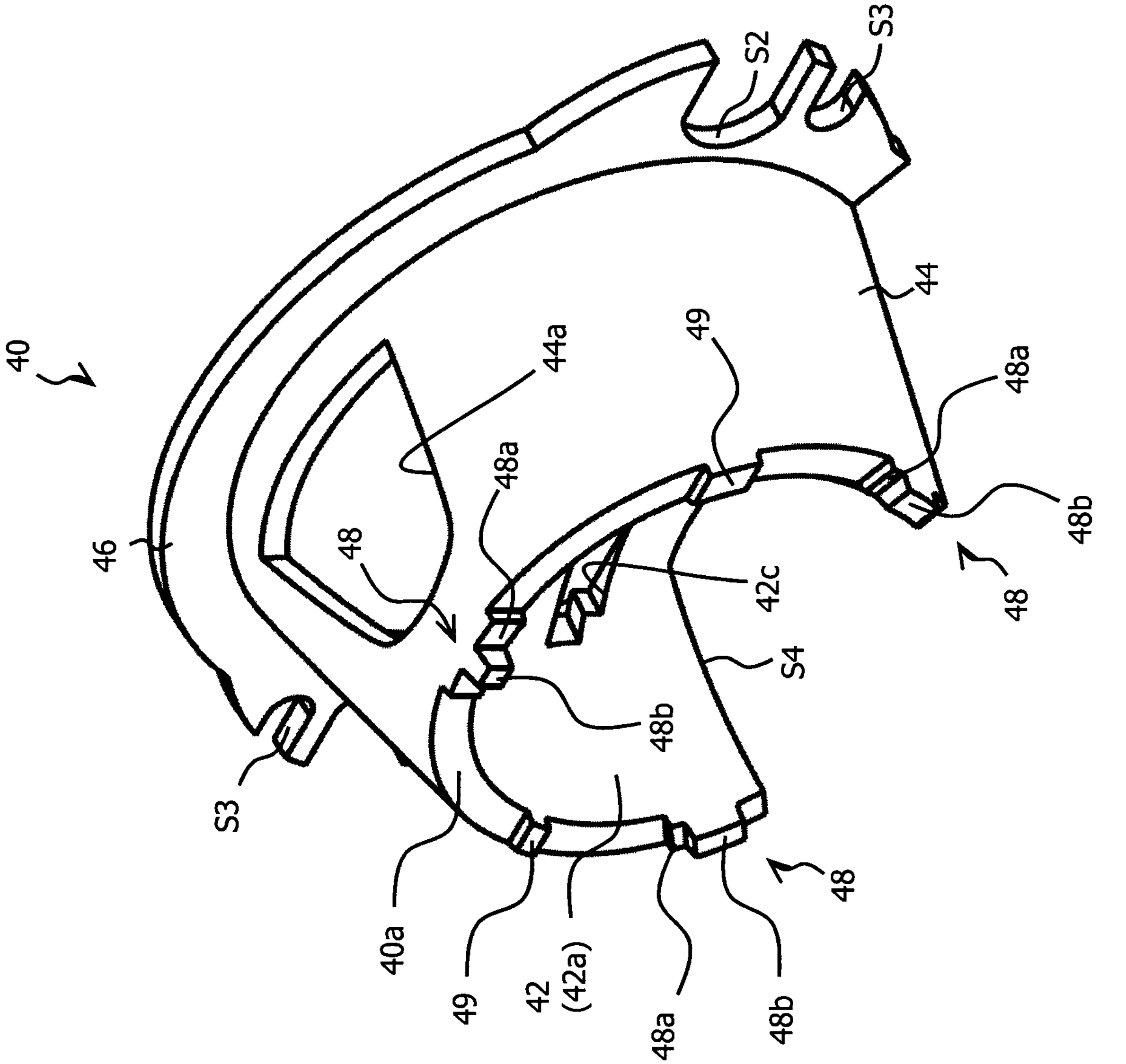
FIG. 6 is a perspective view of the holder 40.

FIG. 6 is a perspective view of the holder 40.

As illustrated in FIG. 6, the holder 40 is made of synthetic resin (e.g. acrylic and polycarbonate), and includes a cup-shaped holder main body 42 of which front side is open and rear side is closed. The holder 40 is an example of a first holding member of the present invention.

A front surface 42*a* of the holder main body 42 is configured as a surface having an inverted shape of the back surface of the separator 50 (back surface 52*b* of an upper separator main body 52 and a back surface 53*b* of the lower separator main body 53), so that the back surface of the separator 50 is surface-contacted.

In the holder main body 42, a through hole 42*c*, to which a light guiding unit 52*d* and a light guiding unit 53*d* of the separator 50 are inserted (e.g. press fitted or engaged), is formed. The through hole 42*c* penetrates through the front surface 42*a* and the back surface 42*b* of the holder main body 42 (see FIG. 3).

In the holder main body 42, a tubular unit 44, which extends backward (Z axis direction) from the peripheral portion of the holder main body 42, is disposed. In the tubular unit 44, a though hole 44*a* is formed to release heat, generated in the light source module 30, to the outside. At the front end of the tubular unit 44, a flange unit 46, which contacts (surface-contacts or appropriately surface-contacts) the holder contact surface 22*a*3 of the heat sink 20, is disposed. The flange unit 46 is an example of a first portion of the present invention.

In the flange unit 46, a notch S2 is formed so that the retainer contact surface 22*a*4 (step difference) of the heat sink 20 does not contact (interfere) with the flange unit 46. Further, The flange unit 46 is provided with a notch S3 into which a positioning pin 88 provided on the secondary lens 80 is inserted.

In the holder main body 42 (and the tubular unit 44), a notch S4 is formed so that the connector 34*c* of the light source module 30 does not contact (interfere) with the holder main body 42 (and the tubular unit 44).

In a front side opening end face 40*a* of the holder 40, convex portions 48 (three locations in FIG. 6) and convex portions 49 (two locations in FIG. 6) are disposed. The convex portion 48 includes a first convex portion 48*a* which protrudes forward from the front side opening end face 40*a* of the holder 40, and a second convex portion 48*b* which is narrower than the first convex portion 48*a* and protrudes forward from the first convex portion 48*a*. The convex portion 49 is a convex portion which protrudes forward from the front side opening end face 40*a* of the holder 40.

Figure 7:
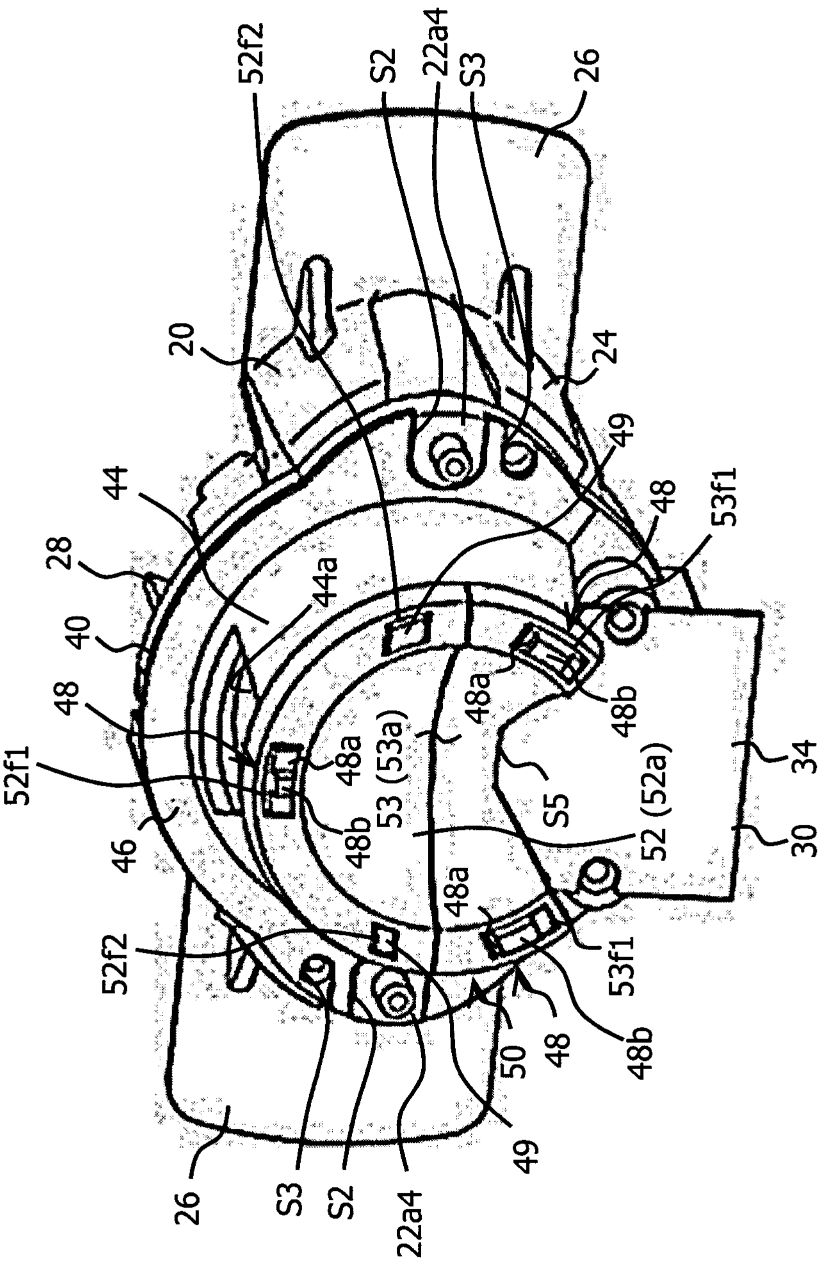
FIG. 7 is a perspective view of a structure constituted by the heat sink 20, the light source module 30, the holder 40 and the separator 50.

FIG. 7 is a perspective view of a structure constituted by the heat sink 20, the light source module 30, the holder 40 and the separator 50.

The holder 40 having the above configuration is disposed in a state where the retainer contact surface 22*a*4 (step difference) of the heat sink 20 is inserted into the notch S2 of the holder 40 (flange unit 46) (see FIG. 7), the flange unit 46 contacts the holder contact surface 22*a*3 of the heat sink 20 (see FIG. 3), and the through hole 42*c* and the light source module 30 (the plurality of light sources 32*a* and 32*b*) face each other (see FIG. 4).

Figure 8:
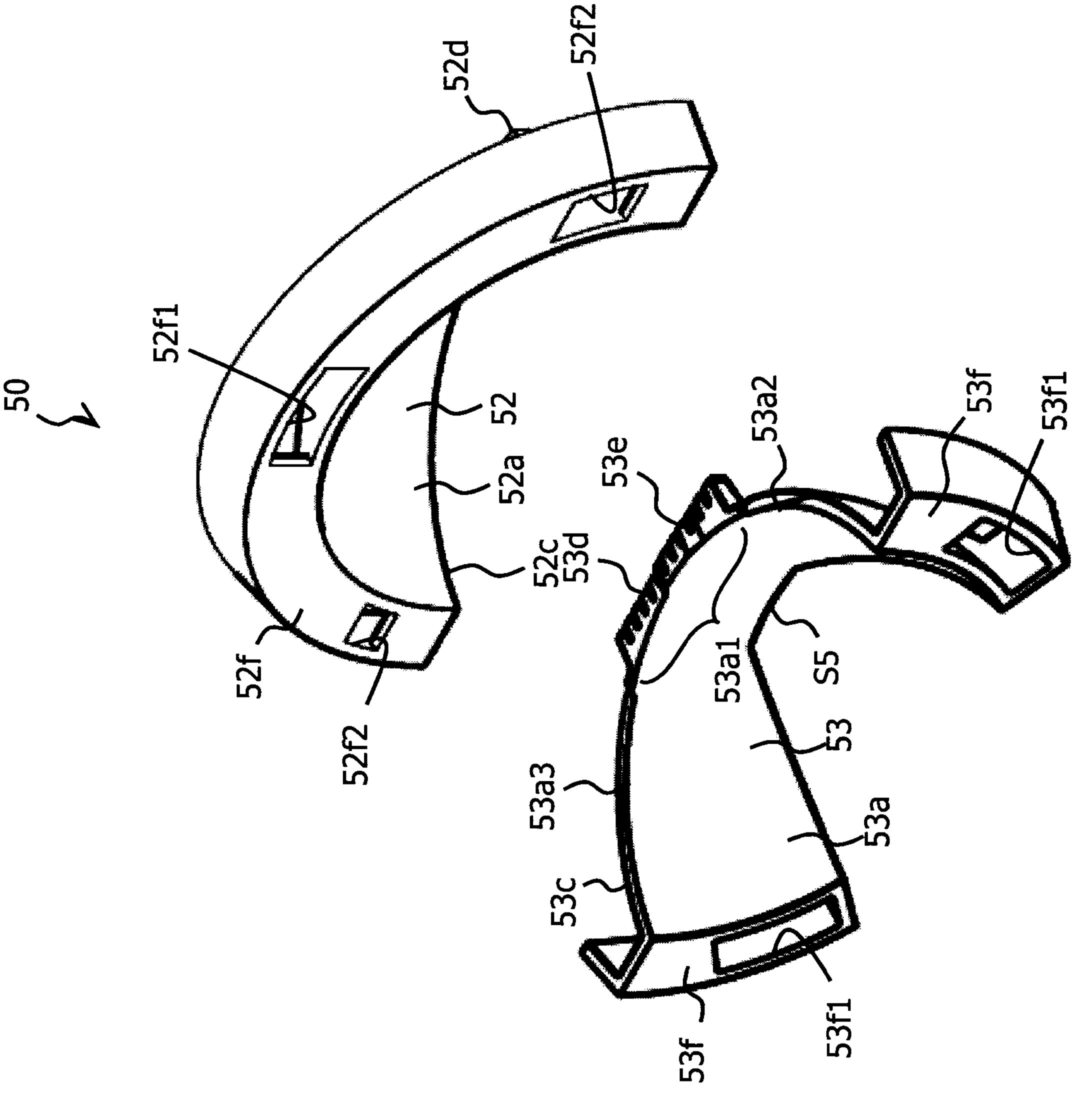
FIG. 8 is a perspective view of the separator 50.

FIG. 8 is a perspective view of the separator 50.

As illustrate din FIG. 8, the separator 50 is a cup-shaped member made of silicon resin, of which front side is open and the rear side is closed. The separator 50 includes an upper separator main body 52 and a lower separator main body 53. The separator 50 is an example of a first lens of the present invention. The upper separator main body 52 corresponds to the first light guiding lens, and the lower separator main body 53 corresponds to the second light guiding lens. The separator 50 may be made of synthetic resin, such as acrylic and polycarbonate.

As illustrated in FIG. 4, the upper separator main body 52 is disposed above the reference axis AX, and the lower separator main body 53 is disposed below the reference axis AX. The reference axis AX extends in the X axis direction.

A front surface 52*a* of the upper separator main body 52 is configured as a surface having an inverted shape of the upper half above the reference axis AX of a back surface 60*b* of the primary lens 60 (spherical surface which is concave in the backward direction), so that the upper half of the back surface 60*b* of the primary lens 60 (spherical surface which is convex in the backward direction) is surface-contacted.

The back surface 52*b* of the upper separator main body 52 (see FIG. 3 and FIG. 4) is configured as a surface having an inverted shape of the upper half above the reference axis AX of the front surface 42*a* of the holder 40 (holder main body 42) (spherical surface which is convex in the backward direction), so that the upper half of the front surface 42*a* of the holder 40 (holder main body 42) (spherical surface which is concave in the forward direction) is surface-contacted.

As illustrated in FIG. 9A, the lower edge of the front surface 52*a* of the upper separator main body 52 includes a stepped edge 52*a*1 having a shape corresponding to the cut-off line $CL_{Lo}$ (CL1 to CL3, see FIG. 11A), and extended edges 52*a*2 and 52*a*3 which are disposed on each side of the stepped edge 52*a*1. The extended edges 52*a*2 and 52*a*3 are optically unnecessary, but are disposed to hold the upper separator main body 52 during assembly. The stepped edge 52*a*1 corresponds to the first edge of the present invention. The extended edge may be disposed only on one side.

The stepped edge 52*a*1 includes an edge e1 corresponding to the left horizontal cut-off line CL1, an edge e2 corresponding to the right horizontal cut-off line CL2, and an edge e3 corresponding to the diagonal cut-off line CL3 connecting the left horizontal cut-off line CL1 and the right horizontal cut-off line CL2.

The extended edge 52*a*2 is disposed at a same position as the edge e1 with respect to the Z axis direction, and the extended edge 52*a*3 is disposed at a same position of the edge e2 with respect to the Z axis direction.

A lower end face 52*c* of the upper separator main body 52 (see FIG. 4) is a surface which extends from the lower edge of the front surface 52*a* of the upper separator main body 52 toward the back surface 52*b* of the upper separator main body 52 in the horizontal direction (X axis direction).

As illustrated in FIG. 3 and FIG. 4, the light guiding unit 52*d* is disposed on the back surface 52*b* of the upper separator main body 52, in order to guide the light from the light source module 30 (a plurality of light sources 32*a*). The light guiding unit 52*d*, of which base end is disposed on a partial region including the stepped edge 52*a*1, out of the back surface 52*b* of the upper separator main body 52, extends toward the light source module 30 (the plurality of light sources 32*a*). The partial region including the stepped edge 52*a*1 is a region of the back surface 52*b* of the upper separator main body 52, to which the light source module 30 (light-emitting surfaces of the plurality of light sources 32*a*) faces. The light guiding unit 52*d* is inserted into the through hole 42*c* of the holder 40.

At the front end of the light guiding unit 52*d*, an entry surface 52*e* is disposed. The entry surface 52*e* is in a plane that is parallel with the plane which includes the Y axis and the Z axis, for example. The entry surface 52*e* corresponds to the first entry surface, and the front surface 52*a* corresponds to a first exit surface of the present invention.

The entry surface 52*e* is disposed at a position facing the light source module 30 (light-emitting surfaces of the plurality of light sources 32*a*) in a state where the light guiding unit 52*d* is inserted into the through hole 42*c* of the holder 40 (see FIG. 4). The distance between the entry surface 52*e* and the light source module 30 (light-emitting surfaces of the plurality of light sources 32*a*) is 0.2 mm, for example.

As illustrated in FIG. 5 and FIG. 8, a flange unit 52*f* is disposed on the front side end face of the upper separator main body 52. In the flange unit 52*f*, a through hole 52*f*1 (one location in FIG. 5 and FIG. 8), to which the convex portion 48 of the holder 40 is inserted, and through holes 52*f*2 (two locations in FIG. 5 and FIG. 8) to which the convex portions 49 of the holder 40 are inserted are disposed.

The front surface 53*a* of the lower separator main body 53 is configured as a surface having an inverted shape of the lower half below the reference axis AX of the back surface 60*b* of the primary lens 60 (spherical surface which is concave in the backward direction), so that the lower half of the back surface 60*b* of the primary lens 60 (spherical surface which is convex in the backward direction) is surface-contacted.

The back surface 53*b* of the lower separator main body 53 (see FIG. 3 and FIG. 4) is configured as a surface having an inverted shape of the lower half below the reference axis AX of the front surface 42*a* of the holder 40 (holder main body 42) (spherical surface which is convex in the backward direction), so that the lower half of the front surface 42*a* of the holder 40 (holder main body 42) (spherical surface which is concave in the forward direction) is surface-contacted.

As illustrated in FIG. 9B, the upper edge of the front surface 53*a* of the lower separator main body 53 includes a stepped edge 53*a*1 (edges e1' to e3') having an inverted shape of the stepped edge 52*a*1 and extended edges 53*a*2 and 53*a*3 which are disposed on each side of the stepped edge 53*a*1. The extended edges 53*a*2 and 53*a*3 are optically unnecessary, but are disposed to hold the lower separator main body 53 during assembly. The stepped edge 53*a*1 corresponds to the second edge of the present invention. The extended edge may be disposed only on one side.

The extended edge 53*a*2 is disposed at a position lower than the edge e1' with respect to the Z axis direction, so that a space S9 (see FIG. 9C) is formed between this extended edge 53*a*2 and the extended edge 52*a*2 of the front surface 52*a* of the upper separator main body 52. In the same manner, the extended edge 53*a*3 is disposed at a position lower than the edge e2' with respect to the Z axis direction, so that a space S10 (see FIG. 9C) is formed between this extended edge 53*a*3 and the extended edge 52*a*3 of the front surface 52*a* of the upper separator main body 52.

Thereby when the upper separator main body 52 and the lower separator main body 53 are combined, as illustrated in FIG. 9C, the extended edges 52*a*2 and 52*a*3 of the front surface 52*a* of the upper separator main body 52 and the extended edges 53*a*2 and 53*a*3 of the front surface 53*a* of the lower separator main body 53 does not contact before (and after) the stepped edge 52*a*1 of the front surface 52*a* of the upper separator main body 52 and the stepped edge 53*a*1 of the front surface 53*a* of the lower separator main body 53 are line-contacted. As a result, deviation of the shapes of the optically critical regions can be prevented. The optically critical regions are mainly regions where the luminous intensity distribution corresponding to the low beam light distribution pattern is formed, out of the front surface 52*a* of the upper separator main body 52, and a region where the luminous intensity distribution corresponding to the ADB light distribution pattern is formed, out of the front surface 53*a* of the lower separator main body 53.

The upper end face 53*c* of the lower separator main body 53 (see FIG. 4) is a surface which extends from the upper edge of the front surface 53*a* of the lower separator main body 53 toward the back surface 53*b* of the lower separator main body 53 in the horizontal direction (X axis direction).

As illustrated in FIG. 3 and FIG. 4, the light guiding unit 53*d* is disposed on the back surface 53*b* of the lower separator main body 53, in order to guide the light from the light source module 30 (the plurality of light sources 32*b*). The light guiding unit 53*d*, of which base end is disposed on a partial region including the stepped edge 53*a*1, out of the back surface 53*b* of the lower separator main body 53, extends toward the light source module 30 (the plurality of light sources 32*b*). The partial region including the stepped edge 53*a*1 is a region of the back surface 53*b* of the lower separator main body 53, to which the light source module 30 (light-emitting surfaces of the plurality of light sources 32*b*) faces. The light guiding unit 53*d* is inserted into the through hole 42*c* of the holder 40.

Figure 11A:
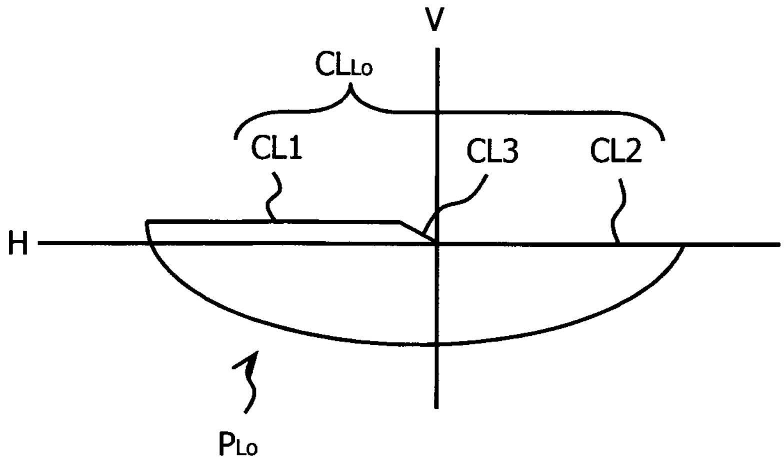
FIG. 11A is an example of low beam light distribution pattern PLo.
Figure 11B:
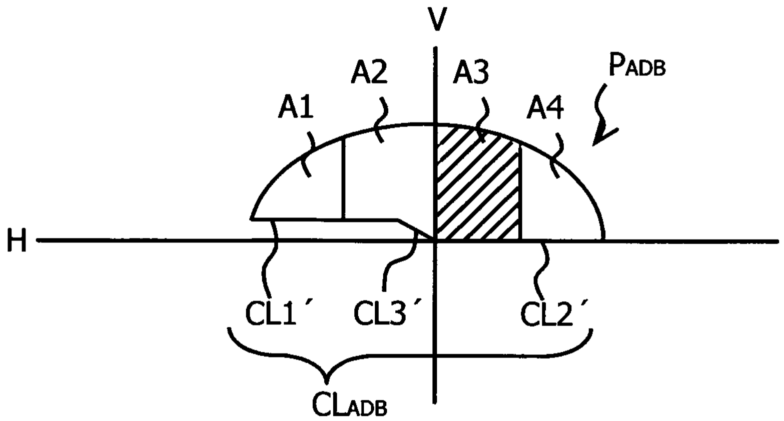
FIG. 11B is an example of ADB light distribution pattern PADB.

At the front end of the light guiding unit 53*d*, an entry surface 53*e* is disposed. The entry surface 53*e* is a surface that is adjusted such that a plurality of regions constituting the ADB light distribution pattern (e.g. a plurality of regions A1 to A4 which are independently turned ON/OFF) are formed in a state of being divided by the vertical edges, as illustrated in FIG. 11B, preventing these plurality of regions from becoming circles and overlapping with each other, as illustrated in FIG. 11D. FIG. 11B and FIG. 11D are ADB light distribution patterns that are formed when a number of ADB light sources 32*b* is four. A hatched region in FIG. 11B and FIG. 11D is a region where the light source 32*b*, corresponding to this region, is turned OFF. The entry surface 53*e* corresponds to the second entry surface of the present invention, and the front surface 53*a* corresponds to the second exit surface of the present invention.

The entry surface 53*e* is disposed at a position facing the light source module 30 (light-emitting surfaces of the plurality of light sources 32*b*) in a state where the light guiding unit 53*d* is inserted into the through hole 42*c* of the holder 40 (see FIG. 4). The distance between the entry surface 53*e* and the light source module 30 (light-emitting surfaces of the plurality of light sources 32*b*) is 0.2 mm, for example.

As illustrated in FIG. 5 and FIG. 8, a flange unit 53*f* is disposed on the front side end face of the lower separator main body 53. In the flange unit 53*f*, through holes 53*f*1 (two locations in FIG. 5 and FIG. 8) to which the convex portions 48 of the holder 40 are inserted are disposed.

In the lower separator main body 53, a notch S5 is formed so that the connector 34*c* of the light source module 30 does not contact (interfere) with the lower separator main body 53.

As illustrated in FIG. 9C, the upper separator main body 52 and the lower separator main body 53 are combined and constitute the separator 50, in a state where the stepped edge 52*a*1 of the front surface 52*a* of the upper separator main body 52 and the stepped edge 53*a*1 of the front surface 53*a* of the lower separator main body 53 are line-contacted, and the spaces S9 and S10 are formed between the extended edges 52*a*2 and 52*a*3 of the front surface 52*a* of the upper separator main body 52 and the extended edges 53*a*2 and 53*a*3 of the front surface 53*a* of the lower separator main body 53 respectively. In this state, the lower end face of the upper separator main body 52 and the upper end face of the lower separator main body 53 are surface-contacted in the range of the stepped edge 52*a*1 of the upper separator main body 52 and the stepped edge 53*a*1 of the lower separator main body 53 (see FIG. 4).

The separator 50 having the above configuration is disposed in a state where the light guiding unit 52*d* of the upper separator main body 52 and the light guiding unit 53*d* of the lower separator main body 53 are inserted (e.g. press-fitted or engaged) into the through holes 42*c* of the holder 40, the entry surface 52*e* of the upper separator main body 52 (light guiding unit 52*d*) and the light source module 30 (light-emitting surfaces of the plurality of light sources 32*a*) face each other, the entry surface 53*e* of the lower separator main body 53 (light guiding unit 53*d*) and the light source module 30 (light-emitting surfaces of the plurality of the light sources 32*b*) face each other (see FIG. 3 and FIG. 4), and the back surface of the separator 50 (back surface 52*b* of the upper separator main body 52 and the back surface 53*b* of the lower separator main body 53) is surface-contacted with the front surface 42*a* of the holder 40 (holder main body 42) (see FIG. 3 and FIG. 4).

Here the convex portions 48 of the holder 40 are inserted into the through hole 52*f*1 of the upper separator main body 52 and the through holes 53*f*1 of the lower separator main body 53 (see FIG. 7). Further, the convex portion 49 of the holder 40 is inserted into the through holes 52*f*2 of the upper separator main body 52 (see FIG. 7).

It is preferable to dispose a reflection member between the lower end face of the upper separator main body 52 and the upper end face of the lower separator main body 53. Then the leakage of the light from the light sources 32*a* and 32*b* through the lower end face of the upper separator main body 52 and the upper end face of the lower separator main body 53 can be suppressed. For the reflection member, a white coating (or thin white film) formed at least on one of the lower end face of the upper separator main body 52 and the upper end face of the lower separator main body 53, or a thin white plate disposed between the lower end face of the upper separator main body 52 and the upper end face of the lower separator main body 53, for example, can be used.

As illustrated in FIG. 5, the primary lens 60 is a spherical lens which includes the front surface 60*a* and the back surface 60*b* on the opposite side of the front surface 60*a*. The primary lens 60 is an example of a second lens of the present invention. The front surface 60*a* is a spherical surface which is convex in the forward direction, and the back surface 60*b* is a spherical surface which is convex in the backward direction. The flange unit 62 is disposed in the primary lens 60. The flange unit 62 is optically unnecessary, but is disposed to hold the primary lens 60 during assembly. The flange unit 62 extends between the front surface 60*a* and the back surface 60*b* so as to surround the reference axis AX. In the flange unit 62, a notch S6, to which the second convex portion 48*b* of the convex portion 48 of the holder 40 is inserted, and an opening S7 (with a bottom face) to which the second convex portion 48*b* of the convex portion 48 of the holder 40 is inserted, are disposed.

Figure 10A:
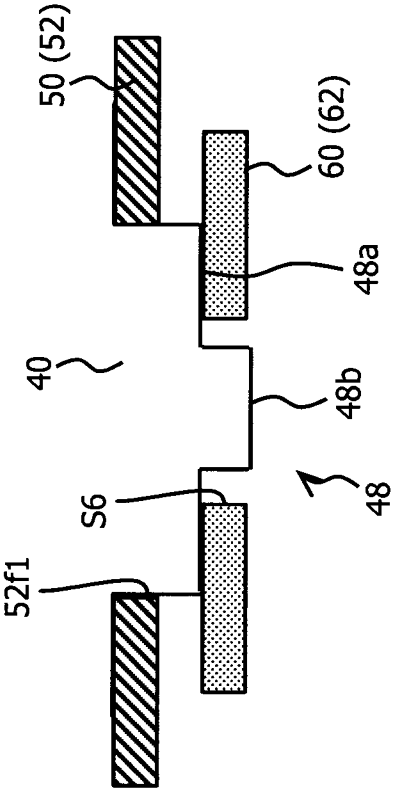
FIGS. 10A and 10B are a diagram depicting a relationship of the convex portion 48 of the holder 40, the separator 50 and the primary lens 60.
Figure 10B:
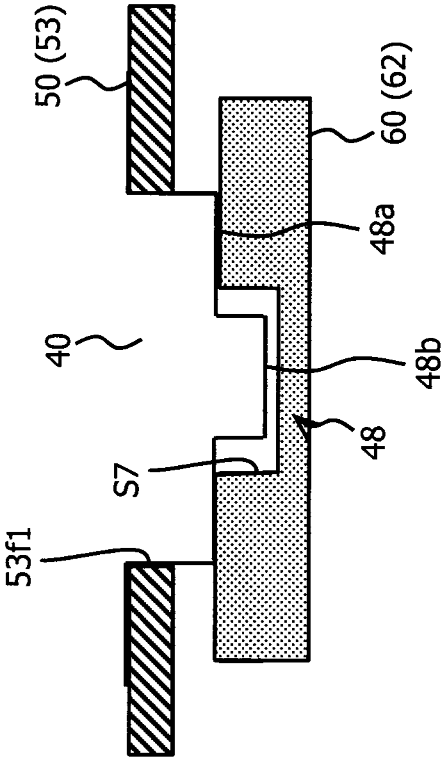

FIG. 10 is a diagram depicting a relationship of the convex portion 48 of the holder 40, the separator 50 and the primary lens 60.

The primary lens 60 having the above configuration is disposed in a state where the second convex portion 48*b* of the convex portion 48 of the holder 40 is inserted into the notch S6 of the flange unit 62 (see FIG. 10A), the first convex portion 48*a* of the convex portion 48 contacts the flange unit 62 (see FIG. 10A), the second convex portion 48*b* of the convex portion 48 of the holder 40 is inserted into the opening S7 of the flange unit 62 (see FIG. 10B), the first convex portion 48*a* of the convex portion 48 is contacted with the flange unit 62 (see FIG. 10B), and the back surface 60*b* of the primary lens 60 is surface-contacted with the front surface of the separator 50 (the front surface 52*a* of the upper separator main body 52 and the front surface 53*a* of the lower separator main body 53) (see FIG. 3 and FIG. 4).

When the first convex portions 48*a* (three locations) of the convex portion 48 formed in the front side opening end face

40*a* of the holder 40 contact the flange unit 62 of the primary lens 60 like this, the primary lens 60 is positioned with respect to the holder 40 (and the separator 50). Thereby a space S11 (see FIG. 3) is formed between a portion other than the front surface of the separator 50 (the front surface 52*a* of the upper separator main body 52 and the front surface 53*a* of the lower separator main body 53), that is, a portion other than the optical surface, and the primary lens 60 (particularly the flange unit 62). The convex portion 48 may be omitted. Even if the convex portion 48 is omitted, the space S11 (see FIG. 3) can be formed between the portion other than the front surface of the separator 50 (a portion other than the optical surface) and the primary lens 60 (particularly the flange unit 62), by moving the position of the front side opening end face 40*a* of the holder 40 backward with respect to the primary lens 60 (particularly the flange unit 62).

By forming this space S11, the contact between the portion other than the front surface of the separator 50 (a portion other than the optical surface) and the primary lens 60 (particularly the flange unit 62) can be prevented. As a result, unnecessary pressure to the separator 50 is not applied, hence deformation of the separator 50 can be prevented.

As illustrated in FIG. 5, the retainer 70 is made of synthetic resin (e.g. acrylic and polycarbonate), and includes a retainer main body 72, which is a tubular body which conically widens from the front side opening end face to the rear side opening end face. The retainer 70 is an example of a second holding member of the present invention.

In the retainer main body 72, a through hole 72*a* is formed to release the heat generated in the light source module 30 to the outside.

As illustrated in FIG. 3 and FIG. 4, a pressor 74, which contacts the flange unit 62 of the primary lens 60 and presses the primary lens 60 (flange unit 62), is disposed on an inner peripheral surface 72*b* of the retainer main body 72. The pressor 74 extends in the circumferential direction of the inner peripheral surface 72*b* of the retainer main body 72.

At the front end of the retainer main body 72, a flange unit 76, which contacts (surface-contacts or approximately surface-contacts) the retainer contact surface 22*a*4 of the heat sink 20, is disposed. The flange unit 76 is an example of a second portion of the present invention.

In the flange unit 76, a notch S8, to which the positioning pin 88 disposed in the secondary lens 80 is inserted, is disposed. A screw hole 76*a*, to which the screw N1 is inserted, is also disposed in the flange unit 76.

The retainer 70 having the above configuration is disposed in a state where the pressor 74 contacts the flange unit 62 of the primary lens 60 (see FIG. 3 and FIG. 4), and the flange unit 76 contacts the retainer contact surface 22*a*4 of the heat sink 20 (see FIG. 3).

When the flange unit 76 contacts the retainer contact surface 22*a*4 (step difference) of the heat sink 20, the vicinity of the flange unit 76 and the holder 40 (mainly the vicinity of the flange unit 46) do not contact, and a space S12 (see FIG. 3) is formed there between.

By forming this space S12, the contact between the vicinity of the flange of the flange unit 76 and the holder 40 (mainly vicinity of the flange unit 46) can be prevented, and unnecessary pressure to the separator 50 is not applied, hence deformation of the separator 50 can be prevented.

As illustrated in FIG. 5, the secondary lens 80 is made of synthetic resin (e.g. acrylic and polycarbonate), and includes a lens main body 82.

The lens main body 82 includes a front surface 82*a* and a back surface 82*b* on the opposite side of the front surface 82*a* (see FIG. 3 and FIG. 4). The front surface 82*a* is a plane that is parallel with the plane which includes the Y axis and Z axis, and the back surface 82*b* is a spherical surface which is convex in the backward direction.

On the outer periphery of the lens main body 82, a tubular unit 84, which extends from the outer periphery of the lens main body 82 in the backward direction (X axis direction), is disposed. At the front end of the tubular unit 84, a pressor/screw receiving unit 86, which contacts a flange unit 76 of the retainer 70 and presses the retainer 70 (flange unit 76), is disposed. The pressor/screw receiving unit 86 is an example of a third portion of the present invention. The pressor/screw receiving unit 86 is disposed on the left and right sides of the tubular unit 84 respectively. Further, in the lens main body 82, the positioning pin 88, which is inserted into the notch S8 of the retainer 70, a notch S3 of the holder 40, and the opening of the heat sink 20, are disposed.

The primary lens 60 and the secondary lens 80 constitute the projection lens of which focal point F (see FIG. 9C) is located in the vicinity of the lower edge (stepped edge 52*a*1) of the front surface 52*a* of the upper separator main body 52 and the upper edge (stepped edge 53*a*1) of the front surface 53*a* of the lower separator main body 53. The curvature of field (rear focal plane) of this projection lens approximately matches the lower edge (stepped edge 52*a*1) of the front surface 52*a* of the upper separator main body 52 and the upper edge (stepped edge 53*a*1) of the front surface 53*a* of the lower separator main body 53.

For the primary lens 60 and the secondary lens 80 constituting this projection lens, the spherical lens and the plano-convex lens according to Japanese Patent Application Publication No. 2015-79660, for example, can be used.

The secondary lens 80 having the above configuration is disposed in a state where the positioning pin 88 is inserted into the notch S8 of the retainer 70, the notch S3 of the holder 40, and the opening of the heat sink 20; the lens main body 82 is disposed ahead of the primary lens 60; and the pressor/screw receiving unit 86 is in contact with the flange unit 76 of the retainer 70 (see FIG. 3 and FIG. 4).

Then, to the heat sink 20, the two screws N1 inserted into the screw hole 22*c* of the heat sink 20 and the screw hole 76*a* of the retainer 70 are screwed into the pressor/screw receiving unit 86, as illustrated in FIG. 3, in a state where the light source module 30, the holder 40, the separator 50, the primary lens 60, the retainer 70 and the secondary lens 80 are disposed in the heat sink, as mentioned above. The two screws N1 are an example of a fixing unit of the present invention.

By screwing the two screws N1 into the pressor/screw receiving unit 86 like this, the retainer 70 (flange unit 76) is held between the heat sink 20 (retainer contact surface 22*a*4) and the secondary lens 80 (pressor/screw receiving unit 86), and the separator 50 and the primary lens 60 are held between the holder 40 (front surface 42*a*) and the retainer 70 (pressor 74) (see FIG. 3 and FIG. 4).

In concrete terms, the separator 50 is held in a state where the front surface (front surface 52*a* of the upper separator main body 52 and the front surface 53*a* of the lower separator main body 53) and the back surface 60*b* of the primary lens 60 are surface-contacted (see FIG. 3 and FIG. 4), and the back surface (back surface 52*b* of the upper separator main body 52 and the back surface 53*b* of the lower separator main body 53) and the front surface 42*a* of the holder 40 (holder main body 42) are surface-contacted (see FIG. 3 and FIG. 4). Thereby the separator 50 is positioned (mainly positioned in the longitudinal direction) with respect to the light source module 30. At this time, the separator 50 is held in a state where the portion other than the front surface (a portion other than the optical surface) and the primary lens 60 (particularly the flange unit 62) do not contact, and the space S11 (see FIG. 3) is formed there between.

The primary lens 60 is held in a state where the back surface 60*b* and the front surface of the separator 50 (the front surface 52*a* of the upper separator main body 52 and the front surface 53*a* of the lower separator main body 53) are surface-contacted (see FIG. 3 and FIG. 4), and the flange unit 62 and the pressor 74 of the retainer 70 are contacted (see FIG. 3 and FIG. 4). The retainer 70 (mainly flange unit 76) is held in a state where the vicinity of the flange unit 76 and the holder 40 (mainly the vicinity of the flange unit 46) are not contacted, and the space S12 (see FIG. 3) is formed there between.

In the state where the separator 50 and the primary lens 60 are held like this, as illustrated in FIG. 10, the second convex portion 48*b* of the convex portion 48 of the holder 40, which is inserted into the through hole 52*f*1 of the upper separator main body 52 (see FIG. 7), is inserted into the notch S6 of the flange unit 62 of the primary lens 60, and the first convex portion 48*a* of the convex portion 48 (see FIG. 7) contacts the flange unit 62 of the primary lens 60. The second convex portion 48*b* of the convex portion 48 of the holder 40, which is inserted into the through hold 53*f*1 of the lower separator main body 53 (see FIG. 7), is inserted into the opening S7 of the flange unit 62 of the primary lens 60, and the first convex portion 48*a* of the convex portion 48 contacts the flange unit 62 of the primary lens 60.

In the case of the vehicular lamp fitting 10 having the above configuration, when the plurality of low beam light sources 32*a* are turned ON, the lights from the plurality of low beam light sources 32*a* enter through the entry surface 52*e* of the light guiding unit 52*d* of the upper separator main body 52, are guided inside the light guiding unit 52*d*, and exit through the front surface 52*a* of the upper separator main body 52. Thereby a luminous intensity distribution corresponding to the low beam light distribution pattern is formed on the front surface 52*a* of the upper separator main body 52. This luminous intensity distribution includes the edges e1 to e3 (see FIG. 9A) corresponding to the cut-off line $CL_{Lo}$ (CL1 to CL3). The projection lens constituted by the primary lens 60 and the secondary lens 80 inversely projects forward this light intensity distribution. Thereby the low beam light distribution pattern $P_{Lo}$, which includes the cut-off line CL (CL1 to CL3) at the upper edge, is formed, as illustrated in FIG. 11A.

When the plurality of ADB light sources 32*b* are turned ON, the lights from the plurality of ADB light sources 32*b* enter through the entry surface 53*e* of the light guiding unit 53*d* of the lower separator main body 53, are guided inside the light guiding unit 53*d*, and exit through the front surface 53*a* of the lower separator main body 53. Thereby a luminous intensity distribution corresponding to the ADB light distribution pattern is formed on the front surface 53*a* of the lower separator main body 53. This luminous intensity distribution includes the edges e1' to e3' (see FIG. 9B) corresponding to the cut-off line $CL_{ADB}$ (CL1' to CL3'). The projection lens constituted by the primary lens 60 and the secondary lens 80 inversely projects forward the light intensity distribution. Thereby the ADB light distribution pattern $P_{ADB}$, which includes the cut-off line $CL_{ADB}$ (CL1' to CL3') in the lower edge, is formed, as illustrated in FIG. 11B. FIG. 11B indicates the ADB light distribution pattern $P_{ADB}$ which is formed when a number of ADB light sources 32*b* is four. The hatched region in FIG. 11B indicates that the light source 32*b*, corresponding to this region, is turned OFF.

Figure 11C:
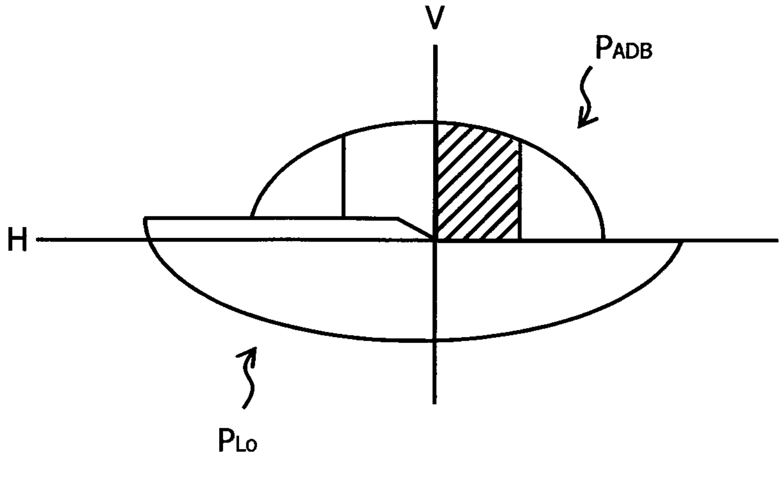
FIG. 11C is an example of a composite light distribution pattern which includes a low beam light distribution pattern PLo and an ADB light distribution pattern PADB.
Figure 11D:
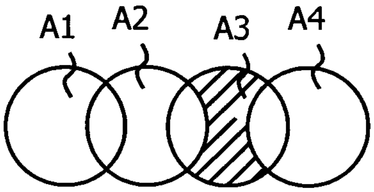
FIG. 11D is a diagram showing a state in which a plurality of regions (for example, a plurality of regions A1 to A4 individually turned on and off) constituting the ADB light distribution pattern are circularly overlapped.

When the plurality of low beam light sources 32*a* and the plurality of ADB light sources 32*b* are turned ON, a composite light distribution pattern which includes the low beam light distribution pattern $P_{Lo}$ and the ADB light distribution pattern $P_{ADB}$ is formed, as illustrated in FIG. 11C.

In this way, a plurality of types of light distribution patterns are formed when the luminous intensity distribution formed on the front surface 52*a* of the upper separator main body 52 and the front surface 53*a* of the lower separator main body 53 are inversely projected in accordance with the lighting states of the plurality of light sources 32*a* and the plurality of light sources 32*b*.

As described above, according to this embodiment, a lens holding structure which firmly surface-contacts a plurality of lenses for a long period of time, and a vehicular lamp fitting including this lens holding structure are provided.

This is because the separator 50 and the primary lens 60 are held between the holder 40 and the retainer 70 in a state where the front surface of the separator 50 (the front surface 52*a* of the upper separator main body 52 and the front surface 53*a* of the lower separator main body 53) and the back surface 60*b* of the primary lens 60 are surface-contacted.

According to this embodiment, deformation of the separator 50 is prevented because the contact between: a portion other than the front surface of the separator (the front surface 52*a* of the upper separator main body 52 and the front surface 53*a* of the lower separator main body 53), that is, a portion other than an optical surface; and the primary lens 60 (specifically the flange unit 62), can be prevented, and unnecessary pressure is not applied to the separator 50.

This is because the space S11 (see FIG. 3) is formed between the portion other than the front surface of the separator 50 (other than the optical surface) and the primary lens 60 (specifically flange unit 62).

According to this embodiment, as illustrated in FIG. 3, a plurality of components (e.g. holder 40, separator 50, primary lens 60, retainer 70, secondary lens 80) can be fixed to the heat sink 20 by screwing with two screws N1, which are inserted in the screw hole 22*c* of the heat sink 20 and the screw hole 76*a* of the retainer 70, into the presser/screw receiving unit 86.

Further, according to this embodiment, the primary lens 60 can be positioned with respect to the holder 40 (and the separator 50) by inserting the convex portion 48 (second convex portion 48*b*) disposed in the holder 40 into the notch S6 and opening S7 of the flange unit 62 of the primary lens 60.

Further, according to this embodiment, deformation of the separator 50 can be prevented because the contact between an area around the flange unit 76 of the retainer 70 and the holder 40 (mainly an area around the flange unit 46) can be prevented, and unnecessary pressure is not applied to the separator 50.

This is because the space S12 (see FIG. 3) is formed between the area around the flange unit 76 and the holder 40 (mainly the area around the flange unit 46).

Further, according to this embodiment, a plurality of types of light distribution patterns can be formed.

This is because the lens holding structure according to the present invention includes not only the upper separator main body 52 but also the lower separator main body 53, and the projection lens (projection lens constituted of the primary lens 60 and the secondary lens 80) inversely projects the luminous intensity distribution formed on the front surface 52*a* of the upper separator main body 52 and the front surface 53*a* of the lower separator main body 53 in accordance with the lighting state of the light source 32*a* and the light source 32*b*.

Modifications will be described next.

In the above embodiment, an example when the holder 40 and the separator 50 are configured as physically separate components was described, but the configuration of the present invention is not limited to this. For example, the holder 40 and the separator 50 may be integrally molded as one component. This integrally molded component may be made of silicon resin, or made of synthetic resin (e.g. acrylic and polycarbonate).

In the above embodiment, an example when the lower separator main body 53 forms the ADB light distribution pattern $P_{ADB}$ was described, but the configuration of the present invention is not limited to this. For example, the lower separator main body 53 may be configured to form the high beam light distribution pattern.

In the above embodiment, an example when a plurality of light sources 32*a* and a plurality of light sources 32*b* are used was described, but the configuration of the present invention is not limited to this. One light source 32*a* and one light source 32*b* may be used.

In the above embodiment, an example when the projection lens constituted of the primary lens 60 and the secondary lens 80 is used as the projection lens which inversely projects forward the luminous intensity distribution formed on the front surface of the separator 50 (the front surface 52*a* of the upper separator main body 52 and the front surface 53*a* of the lower separator main body 53), was described, but the configuration of the present invention is not limited to this. For example, for the projection lens, one lens may be used or a plurality of lenses may be used.

In the above embodiment, an example when the front surface of the separator 50 (the front surface 52*a* of the upper separator main body 52 and the front surface 53*a* of the lower separator main body 53) and the projection lens which inversely projects forward the luminous intensity distribution formed on the front surface of the separator 50 (the projection lens constituted of the primary lens 60 and the secondary lens 80) are surface-contacted (see FIG. 3 and FIG. 4), was described, but the configuration of the present invention is not limited to this. The projection lens can be any projection lens that can inversely project forward the luminous intensity distribution formed on the front surface of the separator 50 (the front surface 52*a* of the upper separator main body 52 and the front surface 53*a* of the lower separator main body 53), and the front surface of the separator 50 and the projection lens may not contact with each other. In other words, a space may be formed between the front surface of the separator 50 and the projection lens.

In the distribution of the above embodiment, the separator 50 is used as the first lens and the primary lens 60 is used as the second lens, but the configuration of the present invention is not limited to this. Different lenses may be used for the first lens and the second lens.

All the numeric values of each of the embodiments are given only for illustration purpose, and appropriate numeric values different from these numeric values can be, of course, used.

Each of the embodiments is given only for illustration purpose in all respects. The present invention is not limited to each of the embodiments in its interpretation. The present invention can be carried out in various ways without departing from its spirit or principal feature.

REFERENCE SIGNS LIST

10 Vehicular lamp fitting
20 Heat sink
22 Base
22*a* Front surface
22*a*1 Light source module mounting surface
22*a*2 Peripheral surface
22*a*3 Holder contact surface
22*a*4 Retainer contact surface
22*a*5 Screw hole
22*a*6 Positioning pin
22*b* Back surface
22*c* Screw hole
24 First extended edge
26 Second extended edge
28 Radiation fin
30 Light source module
32*a* Light source
32*b* Light source
34 Substrate
34*a* Through hole
34*c* Connector
36 Thermal conduction sheet
40 Holder
40*a* Front side opening end face
42 Holder main body
42*a* Front surface
42*b* Back surface
42*c* Through hole
44 Tubular unit
44*a* Through hole
46 Flange unit
48 Convex portion
48*a* First convex portion
48*b* Second convex portion
49 Convex portion
50 Separator
52 Upper separator main body
52*a* Front surface
52*a*1 Stepped edge
52*a*2 Extended edge
52*a*3 Extended edge
52*b* Back surface
52*c* Lower end face
52*d* Light guiding unit
52*e* Entry surface
52*f* Flange unit
52*f*1 Through hole
52*f*2 Through hole
53 Lower separator main body
53*a* Front surface
53*a*1 Stepped edge
53*a*2 Extended edge
53*a*3 Extended edge
53*b* Back surface
53*c* Upper end face
53*d* Light guiding unit
53*e* Entry surface
53*f* Flange unit
53*f*1 Through hole
60 Primary lens
60*a* Front surface
60*b* Back surface
62 Flange unit
70 Retainer
72 Retainer main body

72*a* Through hole
72*b* Inner peripheral surface
74 Pressor
76 Flange unit
76*a* Screw hole
80 Secondary lens
82 Lens main body
82*a* Front surface
82*b* Back surface
84 Tubular unit
86 Pressor/screw receiving unit
88 Positioning pin
A1 to A4 Regions
AX Reference axis
CL Cut-off line
CL1 Left horizontal cut-off line
CL2 Right horizontal cut-off line
CL3 Cut-off line
$CL_{ADB}$ Cut-off line
$CL_{Lo}$ Cut-off line
F Focal point
N1, N2 Screws
$P_{ADB}$ ADB light distribution pattern
$P_{Lo}$ Low beam light distribution pattern
S1 to S6, S8 Notches
S7 Opening
S9 to S12 Spaces
e1, e1', e2, e2', e3 Edges

The invention claimed is:

1. A lens holding structure, comprising:
- a first holding member;
- a first lens disposed ahead of the first holding member;
- a second lens disposed ahead of the first lens;
- a second holding member disposed ahead of the second lens; and
- a fixing unit that fixes the first holding member and the second holding member in a state of holding the first lens and the second lens between the first holding member and the second holding member,
- wherein the first lens and the second lens are held between the first holding member and the second holding member in a state of an optical surface of the second lens being surface-contacted with an optical surface of the first lens, and
- a first space is formed between a flange extending from the optical surface of the first lens and a flange extending from the optical surface of the second lens, wherein
- the first lens includes a first light guiding lens and a second light guiding lens which is disposed below the first light guiding lens.

2. The lens holding structure according to claim 1, further comprising:
- a heat sink disposed behind the first holding member;
- a light source module fixed on the front surface of the heat sink; and
- a third lens disposed ahead of the second lens,
- wherein the first holding member includes a first portion which comes into contact with the front surface of the heat sink;
- the second lens includes the flange;
- the second holding member includes a portion which comes into contact with the front surface of the heat sink, and a presser unit which presses down on the flange of the second lens;
- the third lens includes a portion which comes into contact with the portion of the second holding member; and
- the fixing unit fixes the first holding member and the second holding member in a state of the first portion of the first holding member abutting the front surface of the heat sink, the portion of the second holding member abutting the front surface of the heat sink, the portion of the third lens abutting the portion of the second holding member, and the presser unit of the second holding member abutting the flange of the second lens.

3. The lens holding structure according to claim 2, wherein the fixing unit jointly fastens the heat sink, the portion of the second holding member which comes into contact with the front surface of the heat sink, and the portion of the third lens which comes into contact with the portion of the second holding member.

4. The lens holding structure according to claim 2, wherein the first space is formed between the flange extending from the optical surface of the first lens and the flange of the second lens.

5. The lens holding structure according to claim 2, wherein at least one convex portion, which comes into contact with the flange of the second lens, is disposed in the first holding member.

6. The lens holding structure according to claim 5, wherein the convex portion includes a first convex portion which protrudes forward, and a second convex portion which is narrower than the first convex portion and protrudes more forward than the first convex portion.

7. The lens holding structure according to claim 2, wherein a second space is formed between an area around the first portion of the first holding member and an area around the portion of the second holding member.

8. The lens holding structure according to claim 1, wherein the first lens includes the second light guiding lens are separate structures.

9. A vehicular lamp fitting, comprising the lens holding structure according to claim 1.

10. The lens holding structure according to claim 9, wherein
- the second lens includes a convex spherical surface as an incident surface, and
- the first lens includes a concave spherical surface as an emitting surface, which constitutes an inverted shape corresponding to the incident surface of the second lens.

11. The lens holding structure according to claim 1, wherein
- the second lens includes a convex spherical surface as an incident surface, and
- the first lens includes a concave spherical surface as an emitting surface, which constitutes an inverted shape corresponding to the incident surface of the second lens.

12. A lens holding structure, comprising:
- a first holding member in which a first lens is integrally molded;
- a second lens disposed ahead of the first lens;
- a second holding member disposed ahead of the second lens; and
- a fixing unit that fixes the first holding member and the second holding member in a state of holding the second lens between the first lens and the second holding member;
- wherein the second lens is held between the first holding member and the second holding member in a state of an optical surface of the second lens being surface-contacted with an optical surface of the first lens, and a first space is formed between a flange extending from the optical surface of the first lens and a flange extending from the optical surface of the second lens, wherein the first lens includes a first light guiding lens and a second light guiding lens which is disposed below the first light guiding lens.

13. A lens holding structure, comprising:

a first holding member;

a first lens disposed ahead of the first holding member;

a second lens disposed ahead of the first lens;

a second holding member disposed ahead of the second lens; and a fixing unit that fixes the first holding member and the second holding member in a state of holding the first lens and the second lens between the first holding member and the second holding member, wherein the second lens includes a flange unit, the first lens and the second lens are held between the first holding member and the second holding member in a state of an optical surface of the second lens being surface-contacted with an optical surface of the first lens, and a first space is formed between the first lens and the flange unit of the second lens, wherein the first lens includes a first light guiding lens and a second light guiding lens which is disposed below the first light guiding lens.

* * * * *